United States Patent [19]
Kuhnle et al.

[11] 3,869,008
[45] Mar. 4, 1975

[54] BALANCE SCALE

[75] Inventors: Ernst Kuhnle; Josef Schwarz, both of Balingen, Germany

[73] Assignee: Bizerba-Werke Wilhelm Kraut K.G., Balingen/Wurtt, Germany

[22] Filed: Jan. 11, 1974

[21] Appl. No.: 432,628

[30] Foreign Application Priority Data
Jan. 12, 1973 Germany............................ 2301361

[52] U.S. Cl.................................. 177/217, 177/224
[51] Int. Cl. ........................... G01g 1/06, G01g 1/02
[58] Field of Search ........... 177/217, 218, 219, 224, 177/255

[56] References Cited
UNITED STATES PATENTS
1,749,747  3/1930  Hadley............................ 177/219 X
3,183,985  5/1965  Schick et al. ....................... 177/217

FOREIGN PATENTS OR APPLICATIONS
605,457  6/1960  Italy.................................. 177/217

Primary Examiner—George H. Miller, Jr.
Attorney, Agent, or Firm—Michael S. Striker

[57] ABSTRACT

A load support is provided, and mounting means mounts the load support for movement in an upright path between a plurality of positions in each of which the load support has the same orientation as in all others of these positions. A first and a second discrete balance lever are each fulcrumed for separate pivotal movement in mutually opposite directions. A coupling arrangement couples the load support with each of the balance levers for simultaneous pivotal deflection of both of the levers through identical angular increments but in mutually opposite direction in response to movement of the load support in its upright path.

6 Claims, 8 Drawing Figures

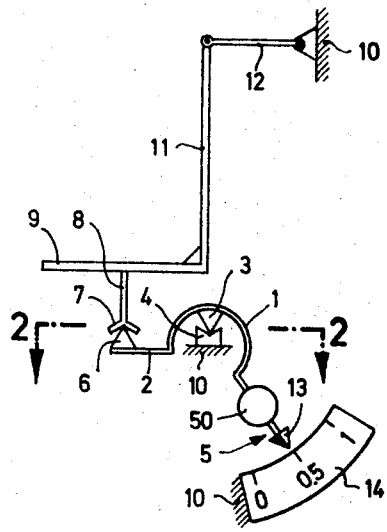
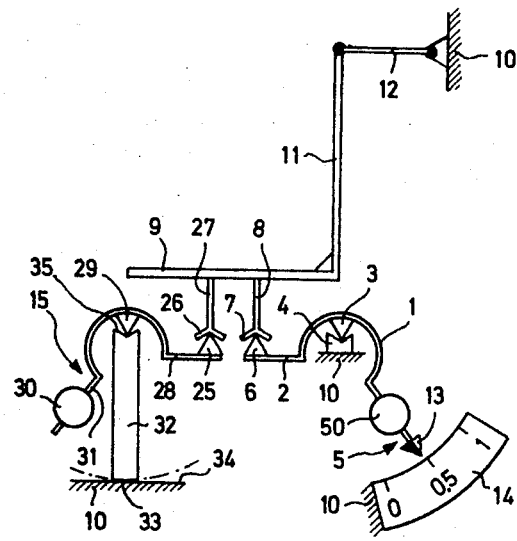
Fig. 1 PRIOR ART
Fig. 3
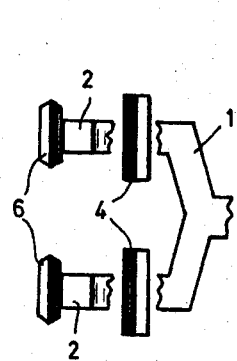
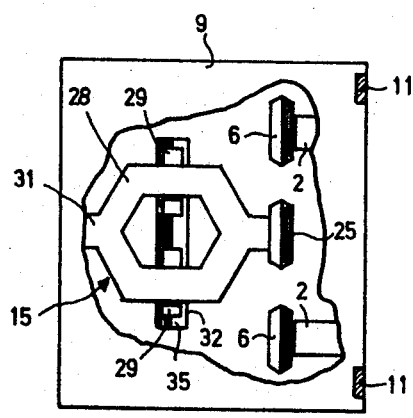
Fig. 2
Fig. 4

BALANCE SCALE

BACKGROUND OF THE INVENTION

The present invention relates generally to a scale, and more particularly to a balance scale especially one that is suitable as a table or counter scale.

It is already known to provide balance scales wherein a balance lever is fulcrumed for pivotal movement, the movement being occasioned by displacement of a load support under the weight of objects which are to be weighted. These known constructions, which are particularly frequently used as counter or table scales, are rather simple in their construction, but are, nevertheless, very accurate. The reason for this is that the tangent of the angle of deflection of the balance lever corresponds mathematically precisely to the weight of the load placed onto the load support. The scale which cooperates with the balance lever must of course be arcuate and can obviously not be linear, but they can be readily so subdivided that it will provide weight indications of any desired increment. Moreover, it can be produced with great precision. This means that in this type of scale the correspondence between the actual object being weighed and the indicated weight as it appears on the scale is almost complete without having to make complicated adjustments of the scale in order to obtain such accuracy. If appropriate optical means are used, the scale can be subdivided into serveral thousand increments which, thanks to the use of the optical means, can still be readily viewed. Such a subdivision of course makes the scale suitable for weighing extremely small amounts, or for producing an indication of extremely great accuracy.

The advantages of such a balance scale are quite obvious from what has been pointed out above. However, these scales also have some very disagreeable and significant disadvantages. In particular, scales of this type are highly sensitive to level variations, means that if the scale is even very slightly out of horizontal due to an unevenness in the surface on which it is placed, or for some other reason, the zero indication of the scale will be off by an amount which far exceeds the permissible deviation. A further drawback of this type of scale is that it reacts very readily to vibrations, impacts or the like, which are transmitted to the support on the surface on which the scale rests. This means that if such a scale is provided with an optical means to facilitate reading of its scale, the indication provided is very jittery and difficult to read or becomes even impossible to read.

It is a direct result of the aforementioned disadvantages that balance scales of the type here being discussed are generally used only for relatively low-accuracy applications, and that for applications where great accuracy is required — for instance where the scale must be subdivided into approximately 10,000 increments are used only in laboratory applications where they can be mounted on massive bases which are absolutely resistant to vibration and the like.

Still another difficulty which has been experienced with balance scales of the type in question is that if the total movement of the balance lever, that is its movement from zero position to the maximum weight that is indicated, is for instance to be indicative of a weight of 10 kg., a requirement which is certainly necessary and reasonable in commercial scales used in stores and the like, the size of the balance lever will become very significant, especially in vertical direction. For this reason, the load support onto which the material to be weighed is placed, must be located relatively high so as not to interfere with the balance lever, and this in turn has certain disadvantages not only in terms of space requirements for the scale but also in terms of handling the scale.

All of the aforementioned difficulties make it quite apparent that further improvements in this type of scale are highly desirable.

SUMMARY OF THE INVENTION

It is, accordingly, a general object of the present invention to provide such further improvements.

More particularly, it is an object of the present invention to provide an improved balance scale of the type under discussion which avoids the disadvantages of the prior art.

An additional object of the invention is to provide such an improved balance scale which is largely immune to interference from inclined positioning and from vibrations and the like.

An additional object of the invention is to provide such an improved scale which is of relatively small construction, and which particularly is low, and which nevertheless affords the previously discussed and desirable tangent characteristic with respect to the weight placed onto its load support and the incremental subdivision of its scale.

Still a further object of the invention is to provide such a balance scale which is highly accurate in the weights which it indicates.

In keeping with these objects and with others which will become apparent hereafter, one feature of the invention resides, in a balance scale, in a combination comprising a load support and mounting means mounting this load support for movement in an upright path between a plurality of positions in each of which the load support has the same orientation as in all others of these positions. A first and a discrete second balance lever are fulcrumed for separate pivotal movement in mutually opposite directions. Coupling means couples the load support with each of the balance levers for simultaneous pivotal deflection of both the levers through identical angular increments but in mutually opposite directions in response to movement of the load support in the aforementioned upright path.

It should be pointed out that balance scales having two cooperating balance levers which are fulcrumed are already known per se. However, in contradistinction to the novel balance scale according to the present invention, these prior-art constructions are such that the movement of the load support is neither directly transmitted to the balance levers, nor always transmitted to the balance lever in a vertical direction and to the knife-edge support of one or both of the balance levers. Because of this these prior-art constructions do not have the desired tangent characteristics. Moreover, because of the coupling of the balance levers in these prior-art constructions, these constructions are difficult to adjust and for various reasons their indicating scales or dials cannot be as finely subdivided as in the construction according to the present invention.

The novel features which are considered as characteristic for the invention are set forth in particular in the appended claims. The invention itself, however, both as to its construction and its method of operation,

BRIEF DESCRIPTION OF THE DRAWING

FIG. 1 is a diagram illustrating the principle of operation and the basic construction of a prior-art balance scale;

FIG. 2 is a section taken on line 2 — 2 of FIG. 1;

FIG. 3 is a view similar to FIG. 1 but illustrating one embodiment of the present invention;

FIG. 4 is a top-plan view of FIG. 3; with portions broken away to show the underlying features;

DESCRIPTION OF THE PREFERRED EMBODIMENTS

Figure 5:
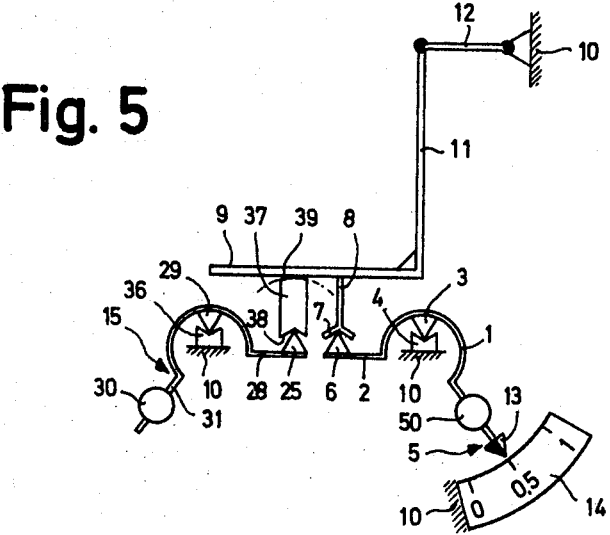
FIG. 5 is a view similar to FIG. 3 illustrating a further embodiment of the invention.

Referring now to the drawings in detail, and firstly to FIGS. 1 and 2 which show an exemplary prior-art embodiment, it will be seen that a balance lever 5 is provided, in form of two arms 1, 2 of which the arm 1 is bifurcated as shown in FIG. 2. Two knife-edge bearings are provided (only one shown in FIG. 1, but both shown in FIG. 2) each having a knife-edge 3 and a seat 4 which is engaged by the knife-edge 3 and is in turn fixed on a stationary component 10, such as a frame of the scale. At a downwardly inclined extension the arm 1 carries a weight 50. The arm 2 carries a pair of knife-edges 6 (one shown in FIG. 1, but both shown in FIG. 2). A load support 9 is arranged above the balance lever 5 and has downwardly extending projections 8 each of which in turn carries a seat 7 which engages with one of the knife-edges 6. The load support 9, the projection 8 and the seat 7 in each case form a rigid unit. A load may be placed directly upon the load support 9, or a receptacle such as a scoop or the like may be interposed and accommodate the load. A parallelogram linkage arm 12 is pivoted to a rod or porjection 11 which is rigidly connected with the load support 9 and at its other end the linkage 12 is pivoted to the frame 10. The length of the linkage 12 corresponds to the distance between the knife-edges 3 and 6 in transverse direction, that is in direction from left to right in FIG. 1. The linkage 12 is oriented in parallel to a straight line connecting these knife edges 3 and 6. This means that when the load support 9 moves upwardly or downwardly in its vertical path, it will always move in parallelism with itself, i.e., in each of the various positions it can assume the orientation of the load support 9 will remain unchanged. This, in turn, assures that the weight of an object or objects to be weighed and resting on the load support 9 will always be transmitted in a vertical direction to the knife edges 6.

The illustration in FIG. 1 is slightly simplified, in that the balance lever 5 has been shown to be provided with a pointer 13 which cooperates with an arcuate scale or dial 14 that is fixedly secured on the frame 10 and is subdivided into increments. The spacing between the divisions representative of the weight increments on the dial 14 is not equidistant, but instead the spacing corresponds to the tangent function, that is it is calculated in accordance with the same. This is, of course, well know per se from such scales and requires no further discussion. FIG. 1 shows the balance lever 5 in a center position, that is it is deflected half-way between its zero position and its maximum deflected position. Conventionally, the pointer 13 will be replaced in actual practice with an optical scale or dial that is provided on the balance lever 5 and which is strongly enlarged and projected onto a ground glass viewing plate which in turn is provided with the reading-off mark.

The prior-art scale shown in FIG. 1 has the desirable characteristic that the tangent of the angular deflection of the balance lever 5 and hence the pointer 13 corresponds exactly to the weight of the object or objects which are placed upon the load support 1. This means that the indications on the dial 13 can be chosen so that a desired degree of accuracy is obtained, i.e., as many subdivisions of the dial 14 as desired can be provided. However, this prior-art construction has the disadvantage that if the scale is not positioned on a completely horizontal surface, or if the surface is provided with only a slight depression causing the scale to be even minutely deflected from a horizontal orientation, the indication will no longer be proper. Furthermore, the scale is highly susceptible to vibrations or the like, which cause jumping of the indicator 13, and in addition, the vertical dimension of the balance lever 5 must be very substantial if relatively large weights (e.g., 10 kg.) are to be weighed which requires that the scale be of large construction, and particularly be rather high.

The invention overcomes these problems as will become apparent from the following discussion of the serveral exemplary embodiments that have been illustrated.

A first one of these embodiments of the novel scale is shown in FIGS. 3 and 4, wherein like reference numerals identify the same components as in FIGS. 1 and 2. In addition, to the elements of FIGS. 1 and 2, the scale in FIGS. 3 and 4 has a further balance lever 15 which is again provided with a weight 30 and which has a knife edge 25 that is engaged by a seat 26 provided on a member 27 which is rigid both with the seat 26 and with the load support 9. It is sufficient to provide only a single knife edge 25 for the balance lever 15 by contrast to the dual knife edges 6 required for the balance lever 5. In FIG. 3 this knife edge 25 has been shown as being laterally spaced from the knife edges 6, in order to provide for a clearer illustration of the principle; in actual fact, however, the knife edge 25 will be located — as is shown in FIG. 4 — between the knife edges 6 and in alignment with the same. This arrangement avoids unnecessary torques which otherwise would have to be absorbed by the load carrier. Also, a possible play existing in the linkage 12 would not act upon the angular position of the balance lever 15 unless the arrangement of the knife edges were as shown in FIG. 4, which in turn would result in false weight indications.

FIG. 4 shows particularly clearly that the knife edge 25 is provided on an arm 28 of the balance lever 15, which are 28 is bifurcated and in turn carries two additional knife edges 29. The weight 30 is provided on an arm 31 of the balance lever 15 and the knife edges 29 rest in a seat 35 of a bearing member 32, the underside of which is formed with a part-cylindrical or part-spherical surface 33 resting on a stationary support 10, i.e., the frame of the scale. It is clear, therefore, that the member 32 can rock in the manner indicated by the curved broken line in FIG. 3. The center of curvature of the surface 33 coincides exactly with the knife edges 29. The member 32 is of course approximately guided so that it can perform the movement indicated by the arcuate broken line on the planar surface 34, but cannot shift laterally. This means that when the member 32 performs this movement, due to its arcuate surface 33, the seat 35 on which the knife edges 29 rest, will shift in a precisely horizontal direction.

When a weight is placed upon the load support 9, the latter moves in parallelism with itself in an arcuate path about the line of contact between the knife edges 3 and their associated seats 4. The knife edge 29 of the balance lever 15 perforce participates in the movement, because the motion of the load carrier 9 is transmitted directly upon the knife edge 25. In addition, the latter also moves about the line connecting the two knife edges 29, which is possible only if the knife edges 29 are readily shiftable to a limited extent in horrizontal direction, which is obtained by the rocking movement of which the member 32 is capable on the surface 34.

It should be appreciated that the member 32 could be replaced with a differently configurated member as long as it permits a similar limited lateral movement of the knife edges 29 in unison and in an exactly horizontal direction. Of course, if the scale does not need to be as highly accurate as the one shown in FIGS. 3 and 4, then it is conceivable to pivotally mount the member 32 to the frame 10, instead of providing the arcuate surface 33, or the mount it on the frame 10 via an interposed spring element.

Due to the provision of the second or auxiliary balance lever 15 the scale of FIGS. 3 and 4 can be of relatively small dimension, particularly as to height, even if the weight range encompassed by its dial 14 is relatively large, for instance on the order of 10 kg. or more. Furthermore this scale shows little or no effect when subjected to vibrations or when it is not exactly horizontal in its orientation. Despite these advantages, it retains the initially outlined advantage, namely the desired tangent characteristic.

A further embodiment of the novel invention is illustrated in FIG. 5, alike reference numerals identifying like elements, as in the preceding Figures. In this embodiment, the difference is that the motion of the load carrier 9 is transmitted to the knife edge 25 not directly but indirectly. For this purpose, the auxiliary balance lever 15 is mounted on the frame 10, and in particular on a pair of seats 36 (only one visible) by means of two knife edges 29 (only one visible) each of which cooperates with one of the seats 36. A member 37 is provided which corresponds to the member 32 of FIGS. 3 and 4, but which, in contradistinction to that member, has an arcuately curved surface 39 which is in engagement with the planar underside of the load carrier 9, so that it can perform the rolling or rocking movement which is diagrammatically indicated by the curved broken line. The lower end of the member 37 is provided with a seat 38 which is engaged by the knife edge 25 formed on the lever 15. The center of curvature of the surface 39 coincides with the knife edge 25, and in this construction the member 37 compensates the various part-circular movements of the components of the scale and assures that the lever 15 will assume exactly the same angularly displaced positions as the lever 5, so that in this embodiment as in the one of FIGS. 3 and 4, the same advantages are obtained, including the desired tangent characteristics ofthe system.

As in FIGS. 3 and 4, it is advantageous and desirable that the knife edge 25 be located intermediate the knife edges 6. It is not absolutely necessary that the lever 15 be located at the same height level as the lever 5, and of course the member 37 can be replaced with other members under the same considerations which have been outlined earlier with respect to the member 32 of FIGS. 3 and 4.

Figure 6:
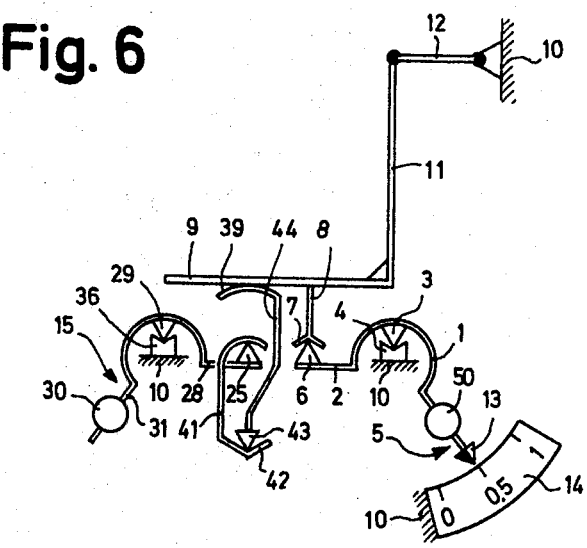
FIG. 6 is a view similar to FIG. 5 illustrating an additional embodiment of the invention.

In the embodiment of FIG. 6 a modification is illustrated of the embodiment of FIG. 5, and again like reference numerals identifying like components. In FIG. 6, however, the height of the construction can be still lower and the length of the member 44 replacing the member 37 can be greater than in the previous embodiment which is advantageous in terms of frictional and rocking characteristics.

FIG. 6 shows a hanging element 41 an upper portion of which rests on the knife edge 25 and a lower portion of which is provided with a seat 42. The member 44 which replaces the member 37 of FIG. 5 has at its lower end a knife edge 43 which engages the seat 42, whereas its upper end is provided with an arcuately curved portion 39 (of part-cylindrical or part-spherical shape) which engages the planar underside of the load support 9 and acts in the same manner as the member 37.

Figure 7:
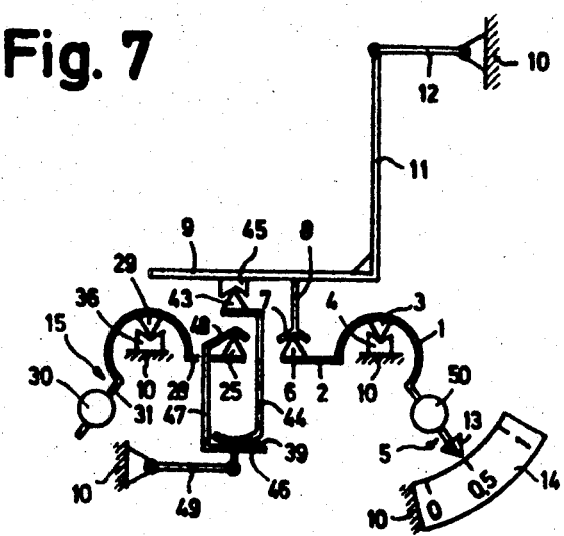
FIG. 7 is a view similar to FIG. 6 illustrating still a further embodiment of the invention.

Another modification of the embodiment of FIG. 5 is shown in FIG. 7. Again, like reference numerals identify like components. Here, however, the member 44 which was discussed with respect to FIG. 6 has been turned through 180°, that is end-for-end. Thus, the end of the member 44 provided with the knife edge 43 can now cooperate with a seat 45 which is fixedly provided on the planar underside of the load carrier 9, whereas the curved portion 39 engages a planar upper surface on a portion 46 of a suspended member 47 which corresponds to the member 41 of FIG. 6 and the upper portion 48 of which forms a seat which is engaged by the knife edge 25, to assure that the upper surface of the portion 46 remains horizontal, the portion 46 is guided in known manner by a parallelogram linkage 49 which is connected with the portion 46 and with the frame 10 or with the latter and with the member 47 in general.

In FIGS. 6 and 7 both, the knife edge 25 is advantageously located between the knife edges 6, in the manner discussed with respect to FIG. 4.

Figure 8:
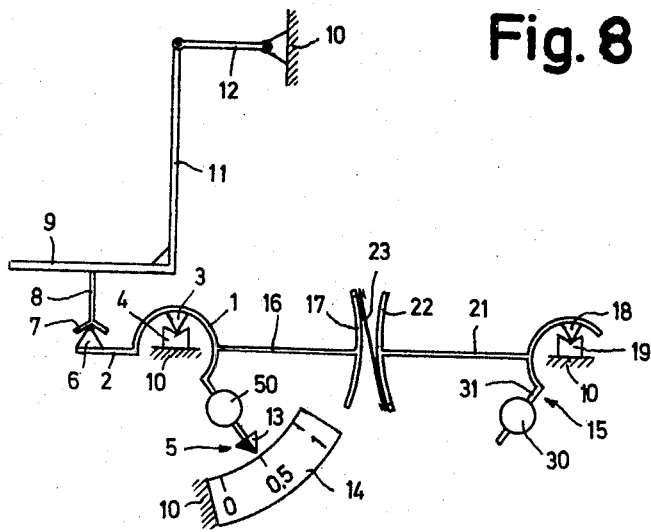
FIG. 8 is a view analogous to FIG. 7, but showing yet a further embodiment of the invention.

Coming, finally to the embodiment in FIG. 8, it will be seen that this diagrammatically illustrates a further possibility in which the auxiliary balance lever 15 is coupled in motion-transmitting relationship not with the load support 9 directly, but only indirectly via a connection with the balance lever 5. The left-hand portion of FIG. 8 is in fact identical with the arrangement that has been shown previously in the various Figures with respect to the balance lever 5 and its connection with the load support 9. In addition, however, the arm 1 of the balance lever 5 is provided with a rigid extension 16 which is provided at its free end with a portion having a part-cylindrical surface 17. The radius of curvature of the surface 17 is such that its center coincides exactly with the line connecting the knife edges 3.

The auxiliary balance lever 15 is mounted on a pair of seats 19 (only one visible) which are fixedly secured on the frame 10, and which are each engaged by one of two (only one shown) knife edges 18 provided on the balance lever 15. A rigid extension 21 projects from the balance lever 15 and is again formed with a portion having a part-cylindrical surface 22 the radius of which is such as to correspond to the radius of the surface 17 and to have its center coincide with the line connecting the knife edges 18.

In its dimensions and in its effect the balance lever 15 corresponds exactly to the balance lever 5, and the seats 4 and 19 are spaced from one another to such an extent that the surfaces 17 and 22 are almost but not quite in contact with one another. A thin flexible strip 23 of suitable material, for instance steel or synthetic plastic material, is connected with one end and in the region of the upper edge of the surface 17 and at its other end in the region of the lower edge of the surface 22, so that it connects the surfaces 17 and 22 at two diammetrally opposite locations. A portion of the member 23 is in engagement with and follows part way the contour of the surface 17, and another portion is in engagement with and follows part way the contour of the surface 22. Because the balance levers 5 and 15 tend to exert mutually opposite forces, the member 23 is maintained in tension and assures that for each movement of the balance lever 5, the balance lever 15 will perform a movement in the opposite direction and to an angular extent corresponding precisely to the angular movement of the balance lever 5. The latter need not be located and fulcrumed at the same level as the balance lever 5, as is shown in FIG. 8, but instead can be located at a higher or a lower level or can be located at the other side (e.g., the left side in FIG. 8) of the balance lever 5. It is, however, necessary, that the surfaces 17 and 21 must be arranged symmetrically with reference to the lines connecting the two knife edges 3, and the two knife edges kinfe on the other hand, so that the double force of the member 23 always acts in direction normal to this line. The member 23 could also be connected at the lower edge of the surface 17 and at the upper edge of the surface 22, which would be an obvious modification. It is also possible to use two of the members 23 which cross one another.

As in the preceding embodiments, the one shown in FIG. 8 has the advantage that the scale continues to have the desired tangent characteristic, while at the same time being little or not at all affected by vibrations or not strictly horizontal conditions of the surface on which it is placed, and that in addition it can be of lower height overall than the prior-art constructions.

It remains to point out that in all embodiments of the invention the position of the parallelogram linkage 12 and the arrangement of the goods-containing scoop (which is not shown) on the load support 9 can be varied without departing from the advantages and concept of the invention.

It will be understood that each of the elements described above, or two or more together, may also find a useful application in other types of constructions differing from the type described above.

While the invention has been illustrated and described as embodied in a balance scale, it is not intended to be limited to the details shown, since various modifications and structural changes may be made without departing in any way from the spirit of the present invention.

Without further anaylsis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. In a balance scale, a combination comprising a load support; mounting means mounting said load support for movement in an upright path between a plurality of positions in each of which said load support has the same orientation; a first and a discrete second balance lever fulcrumed for separate pivotal movement in opposite directions; first and second knife edge bearings which respectively fulcrum said first and second balance levers; and means for coupling said load support with each of said balance levers for simultaneous pivotal deflection of both levers through identical angular increments but in opposite directions in response to movement of said load support in said upright path and vertical transmission of motion from said load support to said balance levers via said coupling means, said coupling means comprising a third knife edge bearing and a fourth knife edge bearing, each of said bearings comprising a first portion constituting a knife edge and a second portion constituting a bearing member, one portion of said first bearing being provided on said first balance lever and the other portion of said first bearing being rockable so that said one portion has limited freedom of displacement in a direction transversely of said path, one portion of said third bearing being provided on said first balance lever and the other portion of said third bearing being provided on said load support, one portion of said fourth bearing being provided on said second lever and the other portion of said fourth bearing being provided on said load support.

2. In a balance scale, a combination comprising a load support; mounting means mounting said load support for movement in an upright path between a plurality of positions in each of which said load support has the same orientation; a first and a discrete second balance lever fulcrumed for separate pivotal movement in opposite directions; first and second knife edge bearings which respectively fulcrum said first and second balance levers; and means fore coupling said load support with each of said levers for simultaneous pivotal deflection of both levers through identical angular increments but in opposite directions in response to movement of said load support in said upright path and vertical transmission of motion from said load support to said balance levers via said coupling means, said coupling means comprising a third knife edge bearing cooperating with said first lever and said load support and a fourth knife edge bearing including a knife on said second balance lever and a bearing member engaging said knife edge and being in rockable engagement with said load support so as to have limited freedom of rocking movement in a direction transversely of said path.

3. In a balance scale, a combination comprising a load support; mounting means mounting said load support for movement in an upright path between a plurality of positions in each of which said load support has the same orientation; a first and a discrete second balance lever fulcrumed for separate pivotal movement in opposite directions; first and second knife edge bearings which respectively fulcrum said first and second balance levers; and means for coupling said load support with each of said balance levers for simultaneous pivotal deflection of both levers through identical angular increments but in opposite directions in response to movement of said load support in said upright path and vertical transmission of motion from said load support to said balance levers via said coupling means, said coupling means comprising a third knife edge bearing cooperating with said first lever and said load support and a fourth knife edge bearing including a knife edge on said second balance lever, a first bearing member pivotably suspended from said knife edge and having a seat, and a second bearing member engaging said seat and being in rockable engagement with said load support so as to have limited freedom of rocking movement in a direction transversely of said path.

4. A combination as defined in claim 3, wherein said first bearing member has an upwardly directed surface, said fourth knife edge bearing further comprising a linkage for horizontally guiding said surface and said second bearing member being in rockable engagment with said surface.

5. A combination as defined in claim 3, wherein said first bearing member is substantially vertically oriented and has an upper portion which is fulcrumed on said knife edge, and a lower portion provided with said seat, said second bearing member having a lower end-portion which rests upon and is pivotable on said seat.

6. A combination as defined in claim 5, wherein said lower portion has an upwardly directed surface which is provided with said seat.

* * * * *